Patented Dec. 12, 1939

2,182,989

UNITED STATES PATENT OFFICE 2,182,989

FERMENTATIVE PRODUCTION OF SOLVENTS FROM GARBAGE

James W. Jean, Pasadena, Calif.

No Drawing. Application April 14, 1937, Serial No. 136,787

4 Claims. (Cl. 195—44)

My invention relates to the production of solvents such as butyl alcohol, acetone, and ethyl alcohol by the fermentation of garbage and other fermentable refuse either alone or with an admixture of other alcoholic fermentable ingredients. In general the simplest form of my invention consists first in reducing garbage or other alcoholic fermentable refuse to a mash, then treating the mash by cooking, cooling, inoculating with *Clostridium felsinae* and fermenting, and finally recovering the resulting solvents from the mash. As a result of the use of *Clostridium felsinae* as a fermenting agent the fermentable constituents of the garbage mash are completely fermented to form a maximum amount of butyl alcohol, acetone, ethyl alcohol and other solvents in a highly efficient and effective manner. Further, the necessity of first treating the garbage with an acid to convert carbohydrates therein to glucose in order to produce fermentation effectively is entirely obviated. The use of *Clostridium felsinae* inoculates the mash and causes the fermentation of substantially all of the fermentable constituents therein. My improved process therefore is simpler and more effective than methods heretofore generally known and practiced.

Tests carried out on the fermentation of garbage with the micro-organism known as *Clostridium felsinae* show that yields of 3.1 per cent solvents, based on weight of raw fresh garbage are obtained. This represents approximately 9.25 gallons of solvents per ton of garbage which when distilled yield approximately:

| | Per cent |
|---|---|
| Butyl alcohol | 60 |
| Acetone | 30 |
| Ethyl alcohol | 10 |

A slight variation in these results occurs due to difference in consistency of the garbage employed.

Description of Clostridium felsinae

*Synonym.*—*Bacillus felsinus*, Carbone and Tombalatio.

*Cultural characteristics.*—Morphology in peptone-glucose broth, 24 hours, 37 degrees C., rods 1.5-4.5 x 0.2-0.5; Clostridia and free spores present in older cultures; young vegetative cells motile by means of peritrichous flagella; gram positive; granulose positive. Colonies in peptone-glucose-agar, small, round or oval, yellow.

*Biochemical characters.*—Nitrates not reduced, indol not formed, catalase negative, gelatin liquefied, H₂S from thiosulphates. Acetylmethylcarbinol not reduced. Pink pigment in corn mash.

*Dissimilation of carbohydrates.*—Acid and gas from glucose, sucrose, lactose, maltose, xylose, levulose, mannose, galactose, amygdalin, salicin, cellobiose, starch, dextrin, glycogen, inulin and pectin. No acid and gas from a-methylglucoside, melezitose, melibose, trehalose, manitol, inositol, sorbitol, adonitol, dulcitol, erythritol and glycerol.

In the practice of my invention, the wet or moist garbage or other waste material is first ground by a grinder or slicing machine. The ground product is next run into a cooker, equipped preferably although not necessarily with a stirrer, where it is subjected to heat treatment at a temperature of substantialy the boiling point of water for about two hours, or until thoroughly cooked. It may with good effect be cooked by steam pressure. Next it is cooled by adding cold water, or by means of a cooling coil, or by exposing to the temperature of the outside atmosphere until reduced to about 37 degrees C. and transferred from the cooker into a fermenting tank where it is inoculated with 10% of a culture of *Clostridium felsinae*, in an amount equivalent to 10% of the mash (by weight) after sufficient water has been added to make a wet mash of substantially 5% carbohydrate. After complete fermentation, which requires about three to four days, the solvents are drawn off, which when separated by distillation or other means produce approximately 60% butyl alcohol, 30% acetone and 10% ethyl alcohol. A trace of butyric and acetic acids and small amounts of acetylmethylcarbinol solvents can be produced. I have found that approximately ten gallons of solvents per ton of moist garbage can be produced by my invention. I have also found that *Clostridium felsinae* is so effective as a fermenting agent that the small amount of free mineral or organic acids present in the garbage do not impair to any marked degree the recovery of solvents from the garbage either as to amount or time consumed in the fermentation process. I have found by careful analysis that due to the relatively large recovery made, the major portion of the solvents obtained arise from the fermentation of the carbohydrates present in the garbage, thus proving that *Clostridium felsinae* has marked advantages over previously used inoculating media. This bacteria is therefore particularly favorable for the fermentation of the fermentable constituents of garbage.

The temperature at which the cooked product is caused to ferment is substantially not above 37 degrees C. This temperature has been found to be highly efficient for the purposes intended but it will be understood that this temperature may be varied either way and fermentation of the product result. Therefore where this temperature of 37 degrees C. is mentioned in the specification and in the claims following it is approximate and not absolute in either direction within the spirit of the invention.

In the operation of a plant for recovering solvents from garbage procured from a municipality, the amount of garbage available daily varies. A plant designed to handle such garbage usually requires a steary supply of garbage whereby it may function most efficiently. In order to use such garbage promptly as furnished and to operate the plant most effectively I add to the garbage in case of shortage a sufficient amount of mash prepared from grain or other vegetable growth to supply the deficiency. The supply of vegetable growth can be added before or after grinding. The fermentation of the garbage and admixture of vegetable growth with *Clostridium felsinae* is equally effective as when garbage alone is employed and the operation of the plant is not therefore impaired by such shortage of supply.

After the liquid solvents have been recovered the remaining tankage can be dehydrated and used for animal and bird food.

I claim:

1. The process of manufacturing butyl alcohol, acetone and ethyl alcohol, from garbage waste which consists of reducing garbage waste to a ground mash, cooking the same and adding water to produce a substantially 5% carbohydrate mash, inoculating said carbohydrate mash with a culture of *Clostridium felsinae* and allowing the same to ferment at a temperature substantially not above 37° C., and finally recovering butyl alcohol, acetone and ethyl alcohol produced by fermentation from said mash.

2. The process of manufacturing butyl alcohol, acetone and ethyl alcohol from garbage waste, which consists of reducing garbage waste to a mash, cooking the mash for substantially two hours, and adding sufficient water to produce substantially a 5% carbohydrate mash, then inoculating said carbohydrate mash with a culture of *Clostridium felsinae* in an amount equivalent to approximately 10% of the mash by weight and allowing it to ferment at a temperature substantially not above 37° C., and finally recovering the liquid solvents from the mash and separating the same into butyl alcohol, acetone and ethyl alcohol.

3. The process of manufacturing butyl alcohol, acetone and ethyl alcohol from garbage waste, which consists of reducing garbage waste to a mash, adding to said waste a fermentable mash prepared from grains to produce a homogeneous mass, cooking said mass for substantially two hours, and adding sufficient water to produce substantially a 5% carbohydrate mass, then inoculating said carbohydrate mass with a culture of *Clostridium felsinae* in an amount equivalent to substantially 10% of the mass by weight and allowing it to ferment at a temperature substantially not above 37° C., and finally recovering the liquid solvents produced by fermentation from the mass and separating the same into butyl alcohol, acetone and ethyl alcohol.

4. The process of manufacturing alcohol and acetone from garbage waste, which consists of reducing garbage waste to a mash, thoroughly cooking the mash, inoculating the mash with a culture of *Clostridium felsinae* and allowing the mash to ferment at a temperature substantially not above 37° C., whereby liquid solvents yielding butyl and ethyl alcohol and acetone are recovered.

JAMES W. JEAN.